INTERCOMMUNICATING TELEPHONE SYSTEMS

Filed July 7, 1960 5 Sheets-Sheet 1

INVENTOR.
Karl L. Burgener
BY
C. A. Dullbrandsen
Atty.

INVENTOR.
Karl L. Burgener
BY C. A. Gulbrandsen
Atty.

INVENTOR.
Karl L. Burgener
BY C. A. Gullbrandsen
Atty.

INVENTOR.
Karl L. Burgener.
BY C. A. Gulbrandsen
Atty.

INTERCOMMUNICATING TELEPHONE SYSTEMS

Filed July 7, 1960 5 Sheets-Sheet 5

INVENTOR.
Karl L. Burgener
BY C. A. Gulbransen
Atty.

United States Patent Office 3,089,000

Patented May 7, 1963

3,089,000
INTERCOMMUNICATING TELEPHONE SYSTEMS

Karl L. Burgener, Villa Park, Ill., assignor to Automatic Electric Laboratories, Inc., Northlake, Ill., a corporation of Delaware Filed July 7, 1960, Ser. No. 41,357
16 Claims. (Cl. 179—42)

This invention relates to intercommunicating telephone systems and particularly to selective intercommunicating systems involving a plurality of stations.

It is the object of this invention to provide a simplified and otherwise improved multi-station intercommunicating telephone system of the type in which signalling between stations is effected on an automatic selective basis by dial controlled common equipment or by manually operable keys individual to a station.

In intercommunicating systems it is the usual arrangement to provide a single talking path over which two or more stations may converse simultaneously. Most of these telephone intercommunicating systems share a common talking path which may be seized by any and all stations in the system. One major drawback of this form of intercommunicating system is the lack of privacy afforded to the conversants. Various common talking path intercommunicating systems have been developed that provide exclusion or lock out facilities whereby privacy may be insured to conversing stations, prohibiting other stations from listening to the conversation. Exclusion type common talking systems require control circuitry individual to each substation as well as a certain amount of common control equipment to provide the necessary exclusion features. It is obvious therefore that the cost of intercommunicating systems with exclusion means to provide privacy will be substantially higher.

In accordance with a particular feature of this invention the combination of telephone stations having only a common talking path at their disposal and stations having a common talking path but including exclusion means to provide privacy in the same system provides an intercommunicating system which may provide a substantially less expensive system than one limited solely to a system having an exclusion feature and yet provide privacy to those stations where privacy may be a requirement.

A specific feature of this invention is the use of common signalling equipment for both telephone stations employing a common talking link with no privacy feature and stations equipped with a common talking link but including a privacy arrangement.

As is frequently the case in an intercommunicating telephone system certain stations may also be provided with telephone facilities to a telephone central office. Obviously it is not practical or necessary to provide the central office facilities to all stations within an intercommunicating system. Occasionally however, the necessity for communicating with a person equipped with a station not having access to a central office becomes necessary on a conference basis or otherwise. Therefore another feature of this invention includes equipment whereby a telephone call from central office facilities can be extended over the intercommunication facilities to a station not normally equipped to receive central office calls.

A further feature of the invention involves facilities and circuitry which permit station-to-station selective signalling between subordinate stations. Another feature of the invention is the selective signalling of system stations by the operation of a dial at a calling station in accordance with a one or two digit code.

A still further feature is the inclusion of an audible call signal at stations as a means for signalling.

Another further feature is the inclusion of a visual signal at stations of the system, which may be utilized to indicate line conditions.

Another feature of the invention is the provision whereby stations in the system may be equipped not only to effect signalling of another station by the dialling of a digital code assigned to such other station, but also to effect the automatic signalling of a certain one or more stations by means of keys individually identified with such stations.

A further feature is the inclusion of facilities whereby a station served by the intercommunicating system may be an off-premise or remotely located station in addition to local stations.

A still further feature are facilities whereby a flashing lamp signal may be used as a means of code signalling between parties of the intercommunicating system.

Yet another feature is the establishment of a conference of selected stations by use of a number of signalling keys operated on a one per station or per called station basis.

These and other features of the invention not specifically identified will be better understood in the detailed description hereinafter made when read with reference to the accompanying drawings in which.

Figure 9:
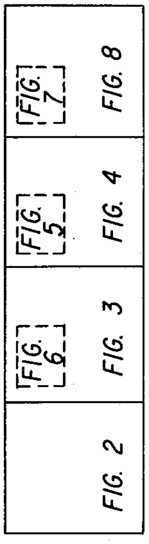
FIGURE 9 is a diagram showing the manner in which FIGURES 2 to 8 should be arranged for an understanding of the invention.
Figure 1:
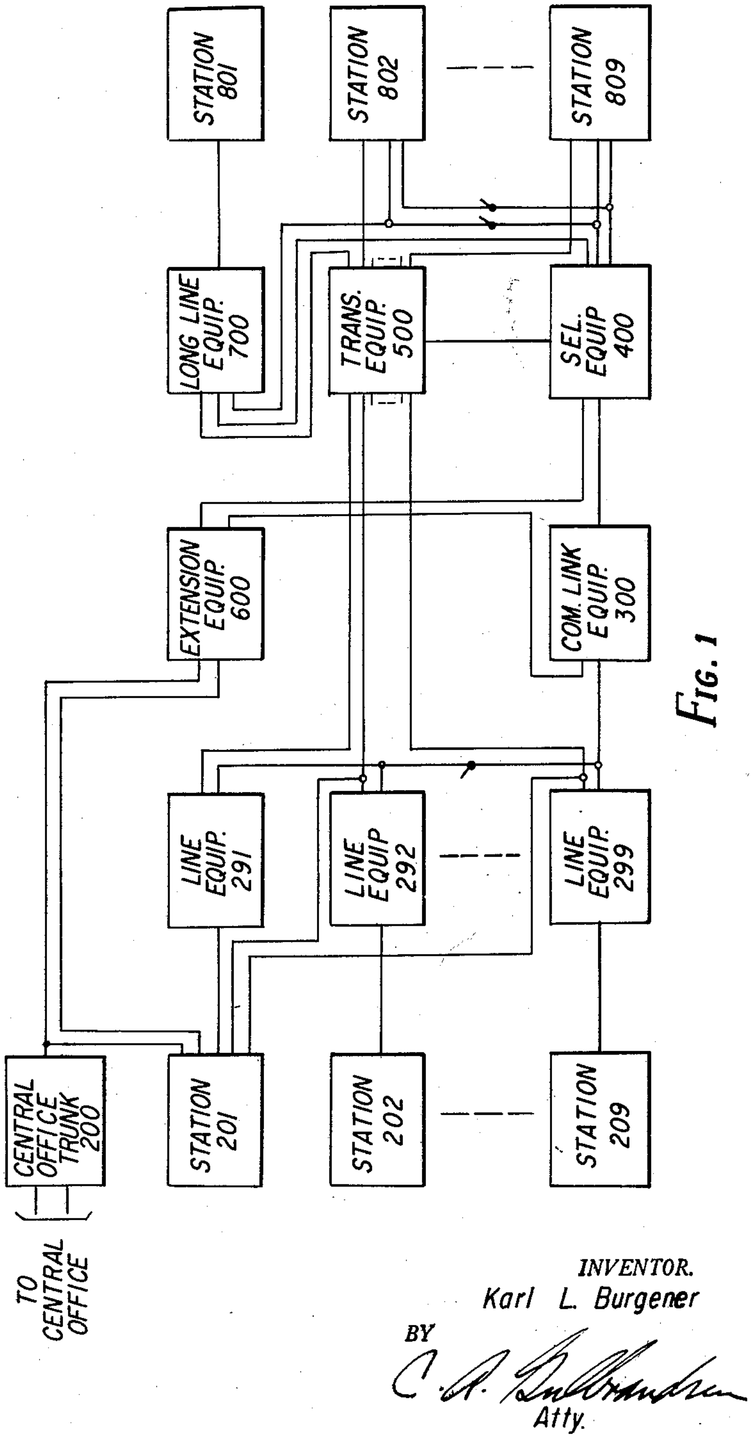
FIGURE 1 is a block diagram showing schematically the various circuit components which cooperate in effecting an intercommunicating system involving the features of the inventions.

Preparatory to describing in detail the operation of the intercommunicating system disclosed in FIGURES 2 to 8, brief reference will be made to the block diagram of FIGURE 1. In this figure several stations, 201, 202, 209, 801, 802 and 809 are shown. Stations 201, 202 and 209 have a privacy or exclusion feature. Stations 801, 802 and 809 do not.

Selector equipment 400 and transfer equipment 500 are utilized for selective signalling on a dial operated basis between all stations.

The individual line equipments 291, 292 to 299 are each associated with an individual line. The link equipment 300 is common to all stations having the privacy feature.

The trunk extension equipment 600 provides facilities whereby a station such as 201 which is normally equipped with a connection to a central office trunk 200 may extend the central office trunk to a selected station not so equipped. Operation of a key extends ground to the line equipment associated with a denied station causing the associated line equipment to extend the necessary visual and audible signals to the signalled station and condition the associated line equipment. When the called station removes the handset from the hookswitch or operates the appropriate pick-up key the relay equipment associated with the signalled station will connect the signalled station directly to the trunk extension circuit 600 which in turn extends the central office trunk circuit so that conversation may now take place between a signalled station not normally provided with central office facilities and a central office subscriber.

Long line equipment 700 provides facilities whereby a station served by the intercommunicating system may be an off-premise or remotely located station. Since the usual audible and visual signals will not function over long distances in an intercommunicating system special features are included in the long line circuit that provide an inter-acting lockout arrangement whereby when a station has previously seized the selector prior to an off-premise extension seizing the same selector; the initial station will not be interfered with and dialling by the off-premise extension will have no effect on the signalling operation. Conversely, if an off-premise station has seized the selector equipment 400 then local extensions are unable to seize the selector.

To place a call between two stations employing the single talking link equipment of applicant's intercommunication system the following sequence of operations will be best understood by referring to FIGURES 2, 3, 4 and 5 taken in combination.

Assume that the calling station shall be station 201 and the called station shall be station 202. For purpose of description we shall assign the signalling code "12" to station 202. The subscriber at station 201 removes the handset from the hook, and depresses pick-up key 253. On the closing of the hookswitch 256 a loop is completed from battery through resistance 381, break contacts 331, 321, 233, the upper winding of relay 220, diode 241, break contact 224, over the line to subscriber station 201, through the hookswitch 256 and station equipment, returning through break contacts 222, 322, the coil of relay 350 to ground. Relay 350 does not operate at this time being marginal in operation.

Relay 220 operates at its upper winding closing its "X" contacts. Battery is then extended from the lower winding of relay 310 through make contact 223, through the substation, break contacts 222, and 322 to ground at relay 350. Operation of relay 310 places ground on relay 320, over make contact 311. The operation of relay 320 is effective to extend ground through relay 350 over make contacts 322 and 225, to the lower winding of relay 220 and then to battery. This operation causes relay 220 to actuate at its lower winding opening the circuit to the upper winding at break contacts 224 connecting the substation by way of its T lead to the upper winding of relay 310 by way of make contact 222 and to the lower winding of relay 310 via lead R and break contact 223. Operation of relay 320 is also effected to extend ground over make contact 324 to relay 430 and its lower winding and thence to battery to actuate relay 430 and to connect a steady battery over make contact 321 to the lamps located at all of the stations of the system designated 201 to 209. The lighting of these lamps is an indication to the subscribers that the system is in operation.

Operation of relay 430 placed ground over make contact 431 to operate relay 440. Relay 440 at its make contact 441 closes a circuit from ground over break contact 333 to prepare a circuit for the operation of relay 460.

Ground is also extended at make contact 443 to prepare locking circuits for relays 510 and 520.

The calling subscriber at station 201 now dials the first digit "1" of the code number "12" of station 202. On opening of the dial springs in dial 259 relay 310 falls away returning ground over break contact 311, make contact 326 and break contact 363 to motor magnet 470 of the rotary switch in selector equipment 400. This ground is extended through interrupter springs 471 and off normal springs 472 to the coil of relay 420 and then to battery.

Operation of relay 420 further extends the ground, extending over contacts 311 and 326, by way of its make contact 424 to relay 450 and then to battery. Interrupted ground is extended over break contact 362, make contact 423 and break contact 464 to the upper and lower windings of relay 460. These windings are in opposition to each other and as a consequence relay 460 does not operate. Upon the closing of the pulsing springs of dial 259 at substation 201 relay 310 comes up again removing ground at break contact 311. It should be noted that because relay 320 has slow to release characteristics, it has remained operated during the preceding events.

Relay 420 was locked to ground at make contact 452. Upon release of motor magnet 470 the rotary switch steps its wipers 473 and 474 forward one step to the first set of bank contacts on levels A and B.

Upon release of relay 450 ground was extended over break contacts 452, and 461 and make contact 422, over wiper 474 and contact (I) of level B to relay 510 causing it to operate. Relay 510 then locks at make contact 514 to ground extended from make contact 443.

After an interval slow-to-release relay 420 drops back removing ground at make contact 422 from the wipers 474 of the rotary switch and removes ground at contacts 423 from relay 460. Since the coils of relay 460 were in magnetic opposition the resultant inductive kick causes relay 460 to operate at its "X" contacts closing ground from contacts 333, and 441 through the windings of both coils in series, causing relay 460 to operate fully to remove battery at break contact 462 and open the previous grounding circuit at break contact 464.

The second digit, in this case "2," is dialled. The pulsing springs interrupt the circuit to relay 310 before relay 310 falls away returning ground over break contact 311, make contact 326, and break contact 363, to motor magnet 470, over interrupter springs 471, off normal springs 472, to relay 420. Relay 420 operates to extend ground from the previously outlined source over make contact 424 to relay 450. Operation of relay 420 also prepares a circuit to ground at make contact 421, to the wipers 413 of a level A of the rotary switch. Motor magnet 470 operates.

On closing of the pulsing circuit at station 201 relay 310 again pulls up removing the ground at contacts 311 allowing the rotary switch wipers 473 and 474 to advance to number 1 bank contacts on both levels A and B, with the sequence again being repeated and the opening of relay 310 actuating motor magnet 470, and again upon release, advancing the wipers to bank contacts numbered 2 on both levels A and B of the rotary switch. Relays 420 and 450 have remained operated during this period because of their slow-to-release characteristics.

After completion of dialling of the final digit relay 310 remains operated removing ground at break contact 311 from the operating path to the motor magnet 470 and relay 450. Relay 450 releases allowing ground to extend over break contact 451, make contact 421, wipers 473, over bank contacts 2 of level A of the rotary switch, through contacts 512 to line equipment 292 associated with called station 202.

Since all line equipments are identical the relay equipment has not been shown in detail for stations 292 to 299. Therefore in describing the operation of line 292 the same designations as used for the line equipment of station 201 (line equipment 291) will be used. Similarly designations used in station 201 will also be used for station 202. The signal ground is extended over conductor C2 through break contact 231 to the coil of relay 230 and then to battery causing relay 230 of line equipment 292 to operate. The same ground that is present at wipers 173 is also extended over make contact 361 to slow to operate relay 340. Because of its slow to operate characteristics relay 340 does not operate at this time.

The operation of relay 230 in relay equipment 292 extends ground over its make contact 232 to relay 340. Relay 230 locks to ground at its make contact 231, over break contact 221 and make contact 325 to ground. A circuit to the upper winding of relay 220 of line equipment 292 is prepared at make contact 233. Shunting ground is placed at make contact 234 to a circuit extending from ground through the coil of relay 350, the make contact 322 to "X" contact 225 of line equipment 292 preventing any possible operation until switch through of relay 350. A circuit is also prepared from the audible signal power supply to audible signal 259 at station 202. The lamp at station 202 is changed from a steady to a flashing state on extension of an interrupted battery from flashing circuit 370 over make contact 236 to lamp 258 at station 202.

Relay 340 now operates to lock to ground at make contact 344, and to extend ground over make contact 343 to relay 360 and to close the audible signal power supply at contacts 342 through to the called station 202. The subscriber at station 202 will now be receiving both audible and visual indications that a call is waiting for him. Operation of relay 360 locks itself to ground at make contact 365 extended over make contact 324 opens the ground path from the selector circuit at break contact 361, removes the recurring ground 371 at break contact 362 from the rotary switch, opens the control circuit for the rotary switch at break contact 363, and extends ground at make contact 364 to the called station 202 by way of break contact 222 of line equipment 292.

Slow-to-release relay 420 now falls away removing ground at make contact 421 from level A of the rotary switch and from relay 340. When relay 340 restores, battery is restored to the circuit prepared for the operation of relay 220 of line equipment 292 at break contact 341, power is removed from the audible signal at make contact 342, ground is removed at make contact 343 to relay 360, but this relay remains operated over its make contact 365. Relay 340 also removes itself from the holding ground at make contact 344.

When the audible signal at station 202 ceases, the subscriber at that station removes the handset from the hookswitch 256 at station 202 and depresses pick up key 253, completing a circuit from battery over resistance 381, break contacts 331 and 341, make contacts 233, of relay equipment 292, through the upper winding of relay 220, diode 250 through the station equipment 202, through break contact 222 of relay 220 of line equipment 292 and the ground previously prepared at make contact 364. Completion of this circuit path on removal of the handset and operation of the pick up key operates relay 220 at its "X" contacts to close the R lead of station 202 through at "X" contacts 223 of line equipment 292 to the lower winding of relay 310; to complete a path from battery through the lower winding of relay 220 to ground over make contact 234. Relay 350 still does not operate because of the shunting action of the ground placed on make contact 234. Relay 220 of line equipment 292 now operates fully removing the operating ground from relay 230 of line equipment 292 at break contact 221.

Both T and R leads of station 202 are now connected to relay 310 at contacts 222 and 223 of line equipment 292. The circuit through the upper winding of relay 220 of line equipment 292 is opened at break contact 224. Removal of the operating ground from relay 230 of line equipment 292 removes the shunting ground at make contact 234 permitting relay 350 to operate. The audible signal circuit for station 202 is opened at make contact 235 of line equipment 292 and the indicator lamp at station 202 is switched from a flashing to a steady state at break contact 236 which extends steady battery.

Both station 201 and station 202 now have their talking paths via leads T and R closed through to battery feed relay 310 and conversation may commence. Other stations such as 209 cannot access the talking path shared by station 201 and 202 since battery to operate relay 220 in a station like 209 is not available by reason of operation of relays 310 and 320. The operation of relay 350 closes ground over make contact 324 through its make contact 351 to slave relay 330. Operation of relay 330 removes ground at break contact 333 from the holding circuit to relay 460 allowing it to release and closes a homing circuit from ground over make contact 362, make contact 333, break contact 423 and off-normal springs 472 to cause motor magnet 470 to step the wipers 473 and 474 of the rotary switch of the selector 400 to their home position in a self-interrupted manner.

During the conversation period relays 310, 320, 350, 360 and 330 are operated as well as relay 220 of line equipment 291 and relay 220 of line equipment 292. Upon completion of the conversation both parties hang up returning their handsets to the hookswitches. When the last party has opened his hookswitch, relay 310 restores having its loop opened at the hookswitch of both stations. Ground is then removed from relay 320 at make contact 311 extending this same ground over break contact 311 through make contacts 326, since relay 320 is slow-to-release, to make contact 442, of relay 440. After its slow-to-release interval relay 320 restores, opens the circuit from the lower winding of relays 220 in both line equipments 291 and 292 to relay 350 causing these relays to restore. Relay 320 on restoration also disconnects the lamp circuits, extinguishing the lamps at all stations in the system by opening make contact 323, removes ground at make contacts 324 to release relay 430, and relays 360 and 330. The restoration of relay 350 also opens operating lead to relay 330 at make contact 351. When relay 360 restores it closes the pulsing contacts 363 through to motor magnet 470 and removes ground at contacts 364.

Relay 330 upon restoring, places resistance battery on the upper windings of the 220 relays of all line equipments and places ground at break contact 333 to the holding circuit of relay 460. Both relays 220 in line equipments 291 and 292 restore and the circuit is now at normal.

Figure 2:
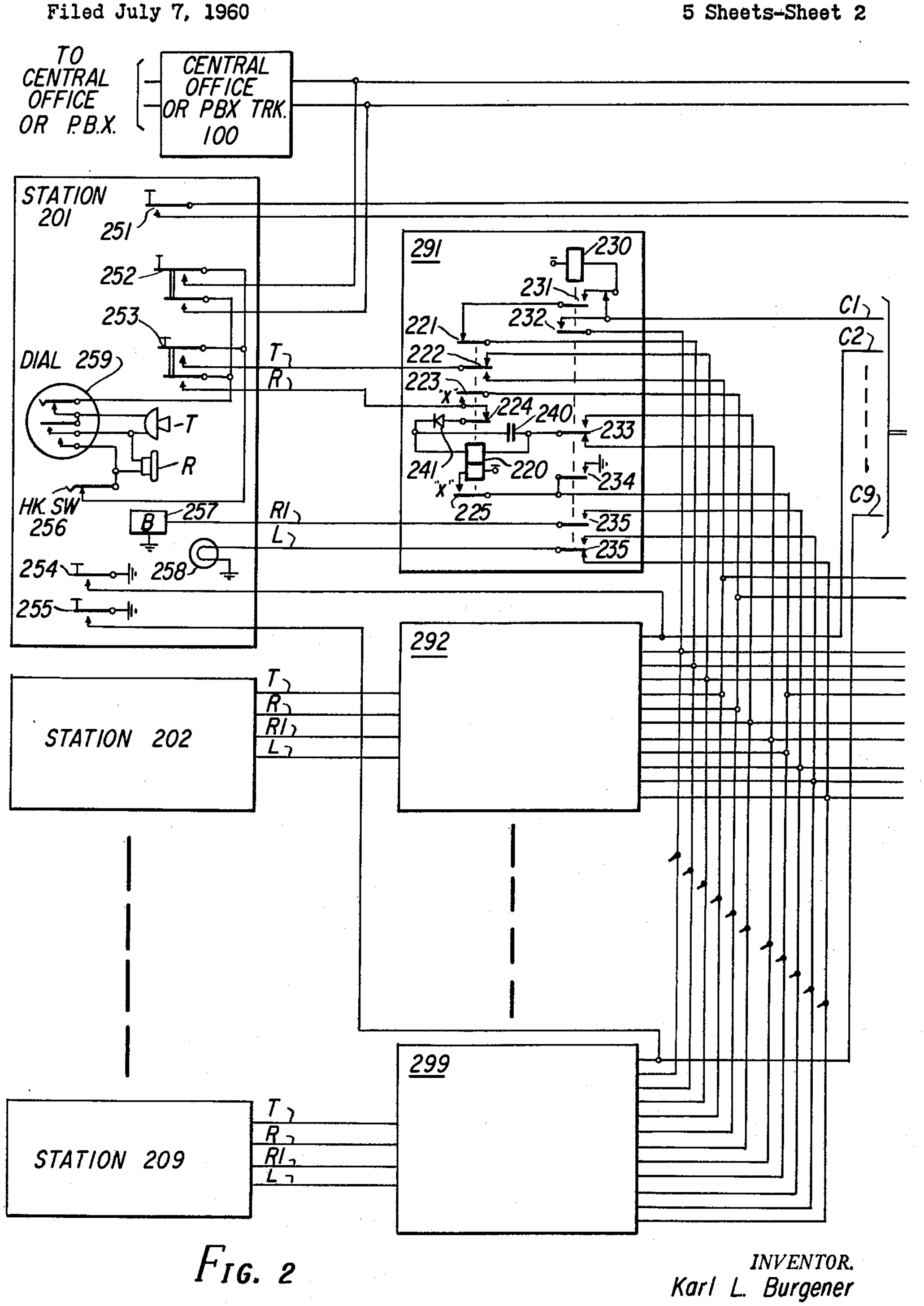
FIGURE 2 is a circuit diagram of several stations of an intercommunicating system which are provided with an exclusion or privacy feature; and of the individual line equipment associated with stations having privacy or exclusion features.
Figures 3, 6:
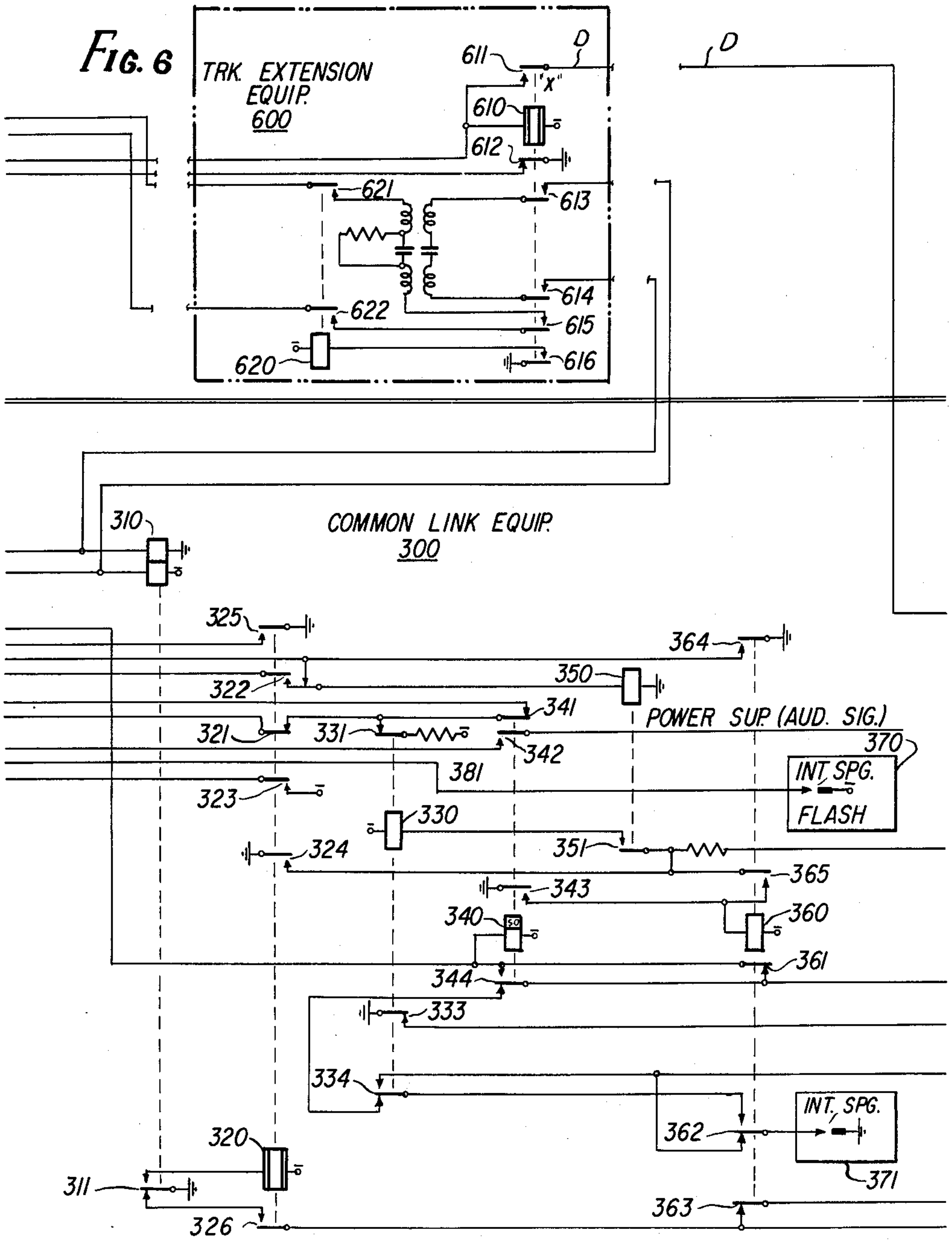
FIGURE 3 is a circuit diagram of link common equipment associated with the provision of privacy or exclusion service to certain stations of an intercommunicating system.
FIGURE 6 is a circuit diagram of a trunk extension circuit which provides for extending an incoming central office or private branch exchange line to one or more intercommunicating stations.
Figures 4, 5:
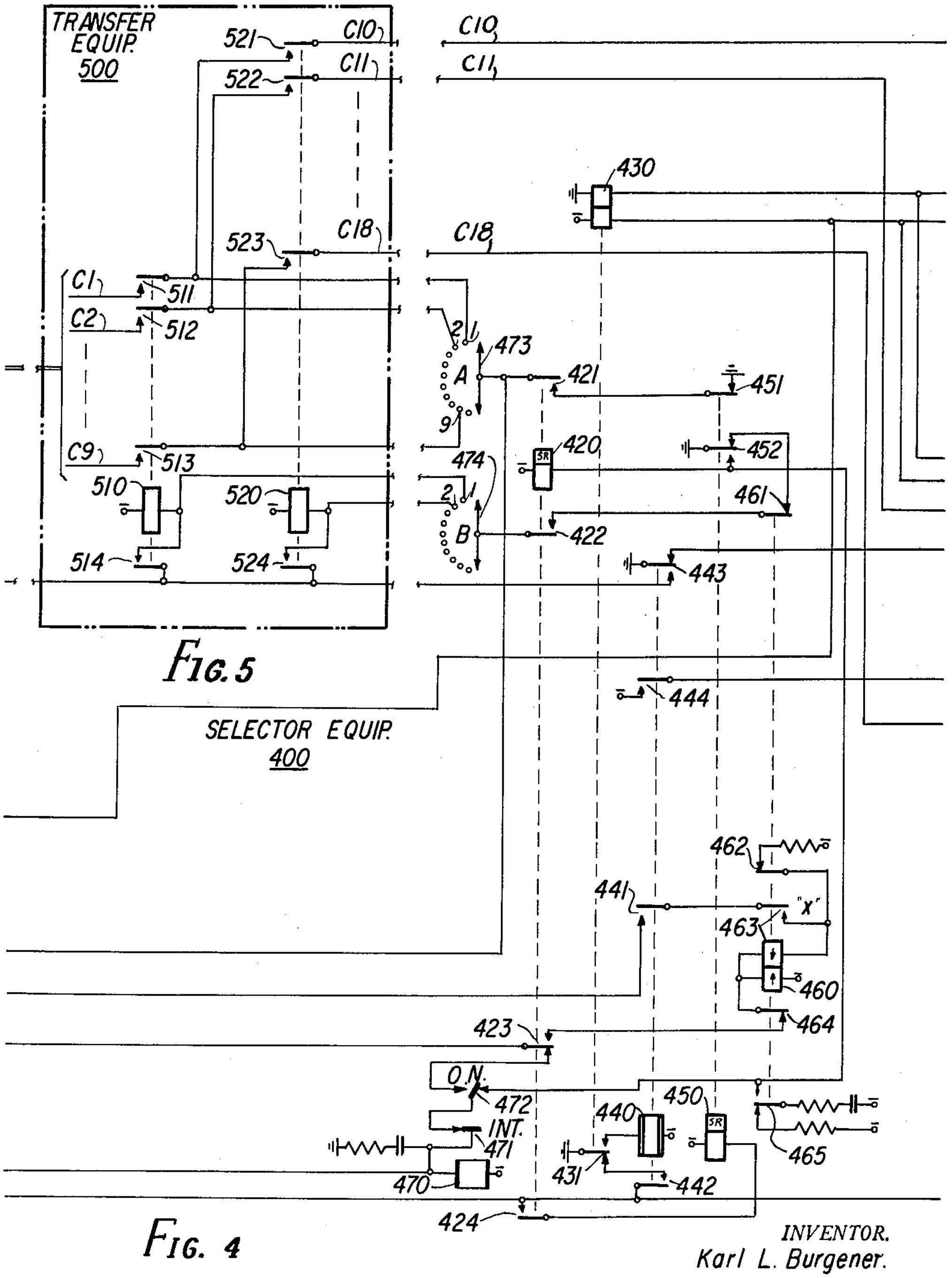
FIGURE 4 is a circuit diagram of the selector equipment which is utilized for selective signalling of the stations in an intercommunicating system.
FIGURE 5 is a circuit diagram of transfer equipment which may be utilized to provide signalling facilities in the intercommunicating system whereby the system may be increased to operate on a two digit basis rather than a single digit basis.

If privacy between two stations in the intercommunications system is not required, the equipment of FIGURES 2 and 3 is not utilized, using only the selector equipment disclosed in FIGURE 4. In this selector only type of intercommunications system the sequence of operation will be best understood by referring to FIGURES 4, 5, 7 and 8 and the following.

Assume the calling station to be 802, and the called station to be 809. For purpose of description we shall assign the signal code "29" to station 804. The subscriber at station 802 removes the handset from the hook. On the closing of the hookswitch 822 a loop is completed from battery to ground and through the upper and lower windings respectively of relay 430. Operation of relay 430 extends ground at make contact 431 to relay 440 causing it to operate. Operation of relay 440 prepares a circuit at its contacts 442 to relay 450 and to motor magnet 470. Ground is also extended over make contact 443 to prepare a locking circuit at make contacts 514 and 524 of relay 510 and 520 respectively. Removal of ground from break contact 443 is also effective to prevent the seizure of the selector equipment by long line equipment 700 associated with station 801.

Selector equipment 400 is now in condition for calling station 802 to dial the necessary digits. Upon dialling the digit, relay 430 falls away extending ground over its break contact 431 and the make contact 442 of slow-to-release relay 440. This ground is then extended to motor magnet 470 and over interrupter springs 471 and off-normal springs 472 to slow-to-release relay 420 causing it to operate.

Operation of slow-to-release relay 420 extends ground over contacts 452, 461, and 422 to wiper 474 on level B of the rotary switch, and also extends ground to the windings of relay 460 which are in opposition to each other and consequently remain unoperated. Ground is also extended at contacts 424 to relay 450 causing it to operate. Operation of relay 450 extends locking ground to relay 420 via make contact 452 and removes signal ground at contacts 451 from wiper 473 on the A level of the rotary switch of selector equipment 400.

On completion of the first pulse associated with the dialled digit (in this case "2"), relay 430 restores returning ground to relay 440 and removing ground from motor magnet 470 at this time. The wipers 473 and 474 of the rotary switch then advance to the first bank contact, on levels A and B respectively. On reception of the second pulse the foregoing sequence of events is repeated and the wipers are stepped to the second bank contacts. During the operation relays 420, 440 and 450 have remained operated because of their slow-to-release characteristics.

Dialling of the first digit is now complete, and relay 430 is operated. Relay 440 is also operated and ground is no longer extended to the motor magnet 470 and relay 450. Relay 450 after a period of time because of its slow-to-release characteristics releases applying ground at break contact 452, over break contact 461 and make contact 422 of relay 420 which is still operated, to extend ground over wiper 474 to level B of the rotary switch and bank contacts 2 to the coil of relay 520. Because of the presence of ground at make contact 524 relay 520 now locks in the operated position.

Relay 420 now falls away removing ground at make contact 423 from relay 460. Relay 460 because of its windings being in magnetic opposition, on release operates at its "X" contacts because of the inductive kick received upon relay release. Upon operation at its "X" contacts relay 460 now receives ground over make contact 441 placing the upper and lower windings of relay 460 in series for aiding operation. Relay 460 now operates fully, removing resistance battery at its break contact 462 and removing the initial operating circuits at break contact 464. Battery is also applied over make contact 465 to provide stepping battery to operate motor magnet 470 to return the wipers 473 and 474 of the rotary switch to their home position. The operation of relay 460 also is effective to remove ground at break contact 451 from the wiper 474 operating on level B of the rotary switch. The motor magnet 470 now steps the wipers to their home position in a self-interrupted manner.

The subscriber at station 802 now dials the second digit "9," to signal station 809. The dial pulsing springs open the circuit to relay 430, ground is returned over break contact 431, make contact 442 of slow-to-release relay 440 to motor magnet 470 of the rotary switch, further extending ground over interrupter contacts 471, off-normal contact 472 to relay 420 causing it to operate. Operation of relay 420 extends the ground path just traced further over make contact 424 to relay 450 causing it to operate. Operation of relay 450 removes signal ground at break contact 451, applies holding ground at make contact 452 to relay 420. Relay 440 remains operated because of its slow-to-release characteristics. Relay 450 is also held operated from the previous sequence.

On completion of the pulse, relay 430 operates removing ground from break contact 431 and reapplying it to relay 440 removing ground from motor magnet 470 and relay 450. Relay 450 however remains operated because of its slow-to-release characteristics and relay 420 remains operated because of the locking ground at make contact 452. Motor magnet 470 on release of ground causes the wipers 473 and 474 of the rotory switch to step forward to the first bank contacts on both levels A and B. The same sequence is then repeated for the remaining eight pulses representative of the digit 9. The slow-to-release relay 450 now falls away permitting signal ground to be extended over break contact 451 and make contact 421 to the wiper 473, over bank contact 9 of level A through, make contact 523 of relay 520. This ground is then extended to station 809, where it may be used to operate an audible signal device in any well known manner.

When the called party at station 809 removes his handset from the hook he is placed in direct connection with battery feed relay 430, the audible signal device is disconnected, and conversation may commence.

After conclusion of the conversation when the last party has restored the telephone handset to open the hookswitch. Relay 430 restores removing ground from relay 440. Ground is applied over contacts 431 and 442 to motor magnet 470, and further extended to relay 420. After a short period of time relay 440 falls away, relay 420 restores, relay 460 restores by virtue of the holding path being opened at make contact 441 and motor magnet 470 steps the wipers 473 and 474 to their home position in a self-interrupted manner. The system now is in position to receive another call.

Figures 7, 8:
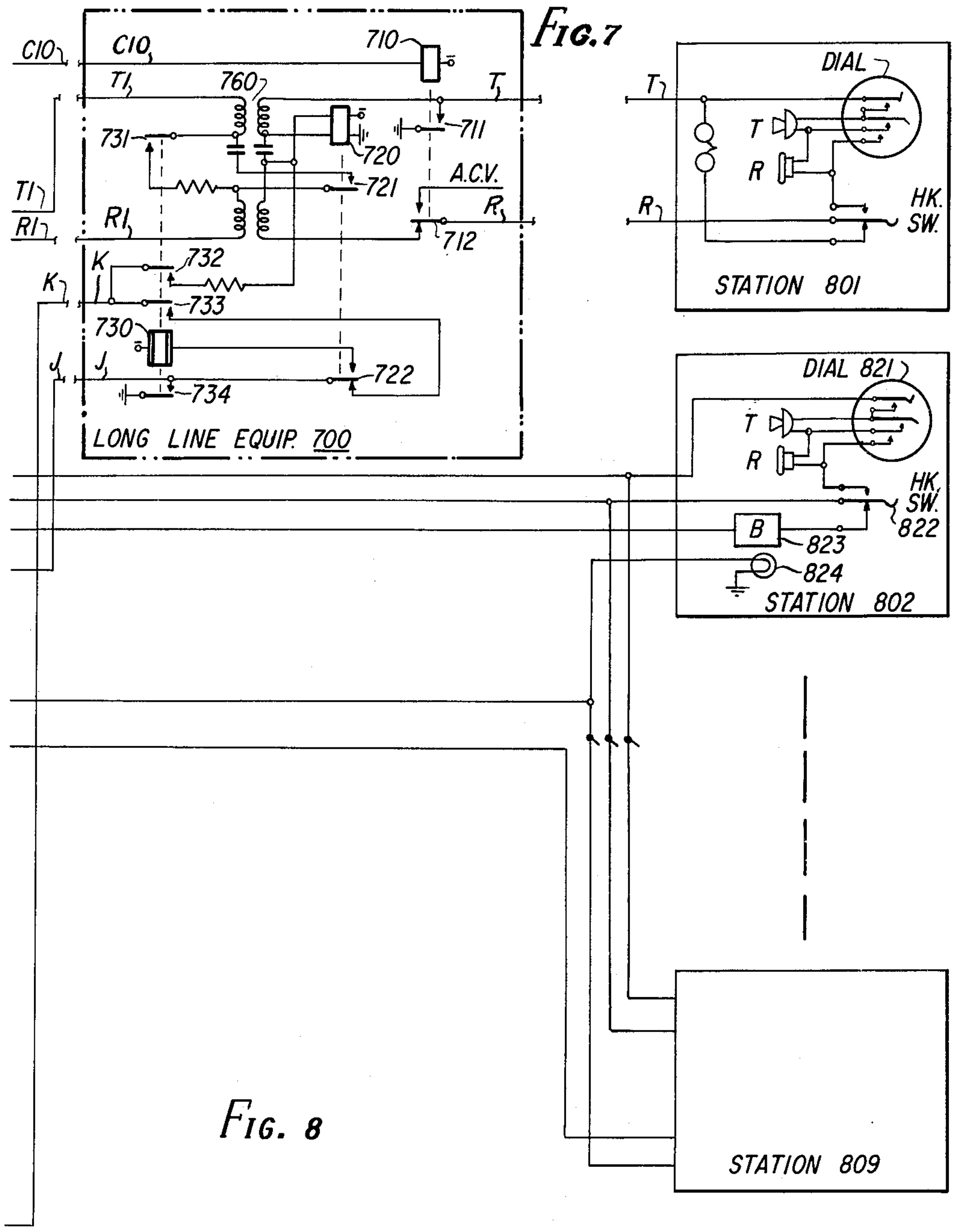
FIGURE 7 is a circuit diagram of long line equipment usable to provide service to an off-premise or remotely located station in an intercommunicating system.
FIGURE 8 is a circuit diagram of telephone stations adapted to be used in the intercommunicating system employing a single talking path but not including an exclusion or privacy feature.

In many intercommunication systems it becomes necessary to have a station located at some distance from the majority of stations included in the system. If this distance is long enough, for example, 2 or 3 miles it becomes impractical to provide all of the control wires to the distant point that are used to set up control and signal indication in most local intercommunications stations. Many times a single pair of wires are all that are available for off-premise intercommunication stations. Then too, devices such as signal lamps or audible signals that are controlled from the central point become marginal in operation when operated over long loop distances. To compensate for this a long line adapter circuit shown as long line equipment 700 in FIGURE 7, is placed between the selector equipment and the off-premise extension or intercommunication station. Operation of this circuit is as follows:

When the handset is removed from the hookswitch the loop leads T and R are closed to both windings of relay 720. Relay 720 operates prepares the loop to the selector 400 by closing leads $T_1$ and $R_1$ at make contact 721. The lead J is extended over make contact 722 to relay 730.

If the selector 400 is idle ground is returned at break contact 443 on lead J. The relay 730 locks at make contact 734 closing a D.C. path at make contact 731 to relay 430 via leads T and R and the secondary windings of repeat coil to seize the selector 400 and prepares a pulsing circuit at make contact 732 extending over lead K to motor magnet 470 of selector 400.

The calling party (station 801) dials the two digits and effects signalling of the called station. Relay 720 follows the dial pulses and when at normal opens relay 730 and extends ground over contacts 734 (which remain operated because of relay 730's slow-to-release characteristics) and break contact 722, make contact 733 to lead K, and thereover to the motor magnet 470 of selector 400.

It should be noted that the motor magnet 470 of selector 400 is pulsed directly by ground pulses on lead K from long line equipment 700, this prevents interference by intercom stations during dialling as long as relay 430 is held operated by long line equipment 700. Stations not realizing that the selector is in operation therefore cannot interfere with dialling by long line subscriber 801.

Conversely when one of the other intercom stations has engaged the selector, off-premise extension 801 cannot seize the selector because of the absence of ground on lead J resulting from the operation of relay 440 by the first calling intercom station. The absence of ground on lead J prevents operation of relay 730 and the seizure of the relay 430 in the selector as well as preventing the repetition of pulses via contact 733 of the long line equipment.

Relay 730 remains operated during pulsing due to its slow-to-release characteristics. Relay 720 reoperates after pulsing opening the pulsing circuit by removing ground from lead K at break contact 722, preparing the transmission circuit and operating relay 730. When the called party answers the transmission circuit is complete, both parties being connected to relay 430 for the purpose of battery feed. The selector 400 is held until both parties disconnect. Conversation may now commence.

Calls from associated stations such as 802 to 809 inclusive may be made to off-premise station 801. When signal ground from the appropriate bank contact (1) on level A of the rotary switch of selector equipment 400 is extended after dialling by one of the intercom stations (802 to 809 inclusive) to signal station 801, ground is extended to relay 710 causing it to operate. Operation of relay 710 places ground at make contact 711 on the T conductor to station 801 and also extends an A.C. signal voltage over make contact 712 and the R conductor to station 801 to operate a bridged signalling device of any well known type located at station 801 to signal the station. After relay 420 restores after its normally slow-to-release interval ground is removed from relay 710 signalling stops and the subscriber at station 801 may answer the call.

Release of the long line equipment 700 on either incoming or outgoing calls is the same. The handset at station 801 is restored the loop to the windings of relay 720 is opened relay 720 restores opening the transmission circuit at contact 721 release relay 730 at contact 722 and extends ground on lead K after its slow-to-release interval. Relay 730 restores opening the D.C. loop to the selector equipment at contact make 731 and removes ground from leads J and K at contacts 733 and 732, respectively. Thus releasing the selector and associated equipment. The circuit now returns to normal.

A valuable feature of applicant's invention is the inclusion of a trunk extension circuit. This circuit can be used to connect a station not normally provided with a central office service to a central office or perhaps a separate PBX line. Operation of the circuit can be best understood by referring to FIGURE 6 in combination with FIGURES 2, 3, and 4. If a station, 209 for example, is not connected to the central office and station 201 has access to a central office line, and station 201 is desirous of transferring a call from the central office to station 209 or to include station 209 in a conference with the party on the central office line the following mode of operation will follow.

The subscriber at station 201 operates a non-locking push key 251. When the push key is operated relay 610 operates at its "X" contacts 611 locking to ground on lead D from contacts 443 of FIGURE 4. Relay 610 now operates fully closing the transmission path through at make contacts 613 and 614 extending ground at contact 616 to relay 620 completing the secondary portion of the transmission circuit at contacts 615, operation of relay 620 is effective to close the transmission path through to the central office trunk circuit at make contacts 621 and 622. Station 209 is now signalled in the manner described previously. Station 201 can now communicate with the party on the central office line.

Conference calls may be set up between the various stations of the system. It is obvious that stations utilizing selector 400 and not the single talking link of FIGURE 2 and FIGURE 3 may converse at any time by simply removing their handset from the hookswitch and being connected to the transmission path fed by relay 430. Thus any number of stations in the system may simultaneously converse in conference as long as transmission battery is adequate for the conversation. The number of stations taking part in this type of conference will be dependent upon such things as line loop resistance, battery supply available, etc.

If however two stations that have the privacy feature as included in the link common equipment 300 and the link line equipment of FIGURE 2 are conversing and wish to add additional parties on to the conversation, signal keys are provided at stations that may have occasion to initiate conferences with leads extending from these signal keys (like 254 and 255) carrying ground to the appropriate C conductors (C1 to C9) of stations that may be desired in on the conference.

Operation and establishment of a conference facility under these conditions would be as follows:

Station 201 would depress key 255 extending ground to the desired conference station 209 at its relay 230 of line equipment 299, over contacts 231, causing relay 230 associated with relay equipment 299 to operate. Operation of this relay extends interrupted battery from flash circuit 370 over make contact 236 to lamp 124 associated with station 209 giving a flashing lamp visual signal that the party is desired and at the same time connecting an audible signal at contact 235 to the audible signal device at station 209. It should be noted that contacts 342 are closed to extend the audible signal, since relay 340 is in operation and because of the established conversation path set up between stations 201 and station 202. At the same time at make contact 233 battery is extended to prepare an operating path to the upper winding of relay 220 associated with relay equipment 299 so that when the subscriber at signalled station 209 removes his handset from the hook a loop is completed that includes the upper winding of relay 220 over a path previously described in connection with the operation of a conventional conversation, causing relay 220 to operate at its "X" contacts and then to further operate to its lower winding to place transmission leads T and R at station 209 at contacts 222 and 223 in connection with relay 310 which provides the necessary talking battery and the transmission path for stations 201 and 209, inclusive. The conversation may now continue and station 209 is included with the previous two stations on a conference basis.

While I have described above the principles of my invention, it is to be clearly understood that this description is made only by way of example and not as a limitation to the spirit and scope of my invention.

What is claimed is:

1. An intercommunicating telephone system including: a first plurality of stations; a plurality of associated line equipments each connected to a different one of said first plurality of stations operated in response to seizure by one of said stations to provide a talking path between two of said first plurality of stations; link means connected to each of said line equipments; a second plurality of stations including a common talking path; each of said stations including a calling device; selecting means connected to said first plurality of stations over said link means and to said second plurality of stations over said common talking path, operated in response to operation of the calling device at any one of said stations; transfer means connected to said selecting means including, an individual circuit connection to each of said first plurality of stations and each of said second plurality of stations, and means controlled by said selecting means to operate said transfer means to transmit a signal to a selected one of said stations over one of said circuit connections.

2. An intercommunicating device as claimed in claim 1 wherein: said first plurality of stations each include an audible signal receiving device, and at least one circuit controlling means; said line equipments each include means operated in response to actuation of one of said control means at an associated station to connect said line equipment to said link means and in response to a signal transmitted from said transfer means to connect said link means to one of said associated stations; said link means comprising a source of talking battery connected over circuit connections to said line equipment, and relay control means operated in response to said selector equipment and said transfer equipment to transmit signals to said audible signal receiving means at one of said first plurality of stations and to said visual signal receiving means at all of said first plurality of stations.

3. An intercommunicating telephone system as claimed in claim 1 wherein: said second plurality of stations each include a signal receiving device; and said selecting means includes a switch operated in response to actuation of one of said calling devices to transmit a signal potential to one of said signal receiving devices.

4. An intercommunicating telephone system including a first plurality of stations; a plurality of associated line equipments each connected to a different one of said plurality of stations operated to provide a talking path between two of said first plurality of stations in response to seizure by one of said stations; link means connected to each of said line equipments; a second plurality of stations including a common talking path; at least one station located remote to said first and said second plurality of stations; each of said stations including a talking device; selecting means connected to said first plurality of stations over said link means and to said second plurality of stations over said common talking path, operated in response to operation of the calling device at one of said stations; long line equipment connecting said remotely located station through said common talking path to said selecting means, operated in response to seizure by said remote station to condition said selecting means to prevent operation by any one of said first and said second plurality of stations; transfer means connected to said selecting means and including an individual circuit connection to each of said first plurality of stations and each of said second plurality of stations and said remote station, and means controlled by said selecting means to operate said transfer means to transmit a signal to a selected one of said stations over one of said circuit connections.

5. An intercommunicating telephone system as claimed in claim 4 wherein: said remotely located station includes an audible signal receiving device; said long line equipment includes signal repetition means whereby pulses from said calling device of said remotely located station are repeated and transmitted to said selector equipment, signal transmitting means whereby signals received from said transfer equipment are transmitted to said audible signal receiving device at said remotely located stations; and said selector means include a rotary switch operated in response to said pulses received from said long line equipment and protection means whereby said selector may not be connected to by said common link equipment or to said second plurality of stations when said rotary switch is controlled by said long line equipment.

6. An intercommunicating telephone system including a first plurality of stations; a plurality of associated line equipments each connected to a different one of said first plurality of stations operated to provide a talking path between two of said first plurality of stations in response to seizure by one of said stations; link means connected to each of said line equipments; a second plurality of stations including a common talking path; selecting means connected to said first plurality of stations over said link means and connected to said second plurality of stations over said common talking path and operated in response to operation of the calling device at any one of said stations; transfer means connected to said selecting means including an individual circuit connected to each of said first plurality of stations and each of said second plurality of stations and means controlled by said selecting means to operate said transfer means to transmit a signal to a selected one of said stations over one of said circuit connections; a trunk circuit connected to a central office and to a particular one of said first plurality of stations; and extension means connected to said trunk and connected to and operated in response to seizure by said particular station, to connect said central office trunk to another one of said first plurality of stations.

7. An intercommunicating telephone system as claimed in claim 6 wherein: at least one of said first plurality of stations includes circuit control means extending to said extension means and signalling means extending to at least one other of said first plurality of stations and said extension means include a repeating coil and relay means operated in response to seizure by said circuit control means at said one of said first plurality of stations.

8. An intercommunicating telephone system including: a first plurality of stations; a plurality of associated line equipments each connected to a different one of said first plurality of stations operated to provide a talking path between two of said first plurality of stations in response to seizure by one of said stations; link means connected to each of said line equipments; a second plurality of stations including a common talking path; at least one station located remote to said first and said second plurality of stations; each of said stations including a calling device; selecting means connected to said first plurality of stations over said link means and to said second plurality of stations over said common talking path, operated in response to operation of the calling device at one of said stations; long line equipment connecting said remotely located station to said common talking path, operated in response to seizure by said remote station to condition said selecting means to prevent operation by the calling device at any one of said first and said second plurality of stations; transfer means connected to said selecting means including an individual circuit connection to each of said first plurality of stations and each of said second plurality of stations and said remote station, and means controlled by said selecting means to operate said transfer means to transmit a signal to a selected one of said stations over one of said circuit connections; a trunk circuit connected to a central office and to a particular one of said first plurality of stations; and extension means connected to said trunk and said particular stations, operated in response to seizure by said particular station to connect said central office trunk to another one of said first plurality of stations.

9. An intercommunicating telephone system including a plurality of stations each including a calling device; a plurality of associated line equipments each connected to a different one of said pluraltiy of stations operated to provide a talking path between two of said plurality of stations in response to seizure by one of said stations; link means including circuit connections to each of said line equipments; selecting means connected to said plurality of stations over said link means operated in response to operation of the calling device at one of said stations; a trunk circuit connected to a central office and to a particular one of said plurality of stations; and transmitting means connected to said trunk and operated in response to seizure by said particular one of said plurality of stations, to connect said trunk to another one of said plurality of stations.

10. An intercommunicating telephone system including: a plurality of stations each including a calling device, an audible signal receiving device, a visual signal receiving device, and at least one circuit controlling means; a trunk circuit connected to a central office and to at least one of said plurality of stations; extension means connected to said trunk including a repeating coil and relay control means operated in response to actuation of said circuit control means at said one of said plurality of stations connected to said central office trunk to connect said central office trunk to a second one of said plurality of stations; at least one of said plurality of stations including circuit control means connected to said extension means and signalling means connected to at least one other of said plurality of stations; a plurality of associated line equipments each connected to a different one of said plurality of stations operated on seizure to provide a talking path between two of said plurality of stations; link means including circuit connections to each of said line equipments; selecting means connected to said plurality of stations over said link means including an individual circuit connection to each of said plurality of stations, and a rotary switch operated in response to operation of one of said calling devices to transmit a signal potential to one of said signal receiving devices, over one of said circuit connections; said line equipments each including means operated in response to actuation of one of said circuit control means at an associated station to connect said line equipment to said link means and in response to a signal transmitted from said selecting means to connect said link means to a selected one of said associated stations; said link means comprising a source of talking battery connected over circuit connections to said line equipment and relay control means operated in response to operation of said selector equipment to transmit signals to said audible signal receiving device at one of said plurality of stations and to said visual signal receiving device at all of said plurality of stations.

11. An intercommunicating telephone system including: a plurality of stations including a talking path and each including a calling device; at least one station located remote to said plurality of stations; selecting means connected to said plurality of stations over said common talking path including an individual circuit connection to each of said plurality of stations and said remote station, operated in response to operation of the calling device at one of said stations to transmit a signal to a selected other one of said stations over one of said circuit connections; long line equipment connecting said remotely located station through said common talking path to said selecting means, operated in response to seizure by said remote station to control said selecting means and to condition said selecting means to prevent operation by any one of said plurality of stations.

12. An intercommunicating telephone system including: a plurality of stations including a common talking path and each of said plurality of stations including a calling device and a signal receiving device; at least one station located remote to said plurality of stations including an audible signal receiving device and a calling device; selecting means connected to said plurality of stations over said common talking path, including an individual circuit connection to each of said plurality of stations and said remote station, and a rotary switch operated in response to operation of one of said calling devices to transmit a signal potential to one of said signal receiving devices over one of said circuit connections; long line equipment connecting said remotely located station to said common talking path including signal repetition means whereby pulses from said calling device at said remotely located station are repeated and transmitted to said selector equipment and signal extending means whereby signals received from said selecting equipment are connected to said audible signal receiving device at said remotely located station, said long line equipment on seizure conditioning said selecting means to prevent operation by any of said plurality of stations.

13. An intercommunicating telephone system including: a first plurality of stations each including a calling device, an audible signal receiving device, a visual signal receiving device, and at least one circuit controlling means; a second plurality of stations including a common talking path and each of said second plurality of stations including a calling device and a signal receiving device; a plurality of associated line equipments each connected to a different one of said first plurality of stations operated on seizure to provide a talking path between two of said first plurality of stations, link means including circuit connections to each of said line equipments; selecting means including a rotary switch operated in response to operation of one of said calling devices to transmit a signal potential to one of said signal receiving devices, connected to said first plurality of stations over said link means and to said second plurality of stations over said common talking path; transfer means connected to said selecting means including an individual circuit connection to each of said first plurality of stations, operated in response to said selecting means to transmit a signal to a selected one of said stations over one of said circuit connections; said line equipments each including means operated in response to actuation of one of said circuit control means at an associated station to connect said line equipment to said link means and in response to a signal transmitted from said transfer means to connect said link means to a selected one of said associated stations; said link means comprising a source of talking battery transmitted over circuit connections to said line equipment and relay control means operated in response to operation of said selector and said transfer equipment to transmit signals to said audible signal receiving device at one of said first plurality of stations and to said visual signal receiving device at all of said first plurality of stations.

14. An intercommunicating telephone system including: a first plurality of stations each including a calling device, an audible signal receiving device, a visual signal receiving device, and at least one circuit controlling means; a second plurality of stations including a common talking path and each of said second plurality of stations including a calling device and a signal receiving device; at least one station located remote to said first and said second plurality of stations including an audible signal receiving device and a calling device; a plurality of associated line equipments each connected to a different one of said first plurality of stations operated on seizure to provide a talking path between two of said first plurality of stations; link means including circuit connections to each of said line equipments; selecting means including a rotary switch operated in response to operation of one of said calling devices to transmit a signal potential to one of said signal receiving devices, connected to said first plurality of stations over said link means and to said second plurality of stations over said common talking path; transfer means connected to said selecting means including an individual circuit connection to each of said first plurality of stations and each of said second plurality of stations and said remote station operated in response to operation of said selecting means to transmit a signal to a selected one of said stations over one of said circuit connections; said line equipments each including means operated in response to actuation of one of said circuit control means at an associated station to connect said line equipment to said link means and responsive to a signal transmitted from said transfer means to connect said link means to a selected one of said associated stations; said link means comprising a source of talking battery connected over circuit connections to said line equipment and relay control means operated in response to operation of said selector and said transfer equipment to transmit signals to said audible signal receiving device at one of said first plurality of stations and to said visual signal receiving device at all of said first plurality of stations; long line equipment connecting said remotely located station to said common talking path including signal repetition means whereby pulses from said calling device at said remotely located station are repeated and transmitted to said selector equipment and signal extending means whereby signals received from said transfer equipment are transmitted to said audible signal receiving device at said remotely located station, said long line equipment on seizure conditioning said selecting means to prevent operation by any of said first and said second pluralities of stations.

15. An intercommunicating telephone system including: a first plurality of stations each including a calling device, an audible signal receiving device, a visual signal receiving device, and at least one circuit controlling means; a second plurality of stations including a common talking path and each of said second plurality of stations including a calling device and a signal receiving device; a trunk circuit connected to a central office and to at least one of said first plurality of stations; extension means connected to said trunk including a repeating coil and relay control means operated in response to actuation of said circuit control means at said one of said first plurality of stations connected to said central office trunk to connect said central office trunk to a second one of said first plurality of stations; at least one of said first plurality of station including circuit control means connected to said extension means and signalling means connected to at least one other of said first plurality of stations; a plurality of associated line equipments each connected to a different one of said first plurality of stations operated on seizure to provide a talking path between two of said first plurality of stations; link means including circuit connections to each of said line equipments; selecting means including a rotary switch operated in response to operation of one of said calling devices to transmit a signal potential to one of said signal receiving devices, connected to said first plurality of stations over said link means and to said second plurality of stations over said common talking path; transfer means connected to said selecting means including an individual circuit connection to each of said first plurality of stations and each of said second plurality of stations and said remote station operated in response to operation of said selecting means to transmit a signal to a selected one of said stations over one of said circuit connections; said line equipments each including means operated in response to actuation of one of said circuit control means at an associated station to connect said line equipment to said link means and in response to a signal transmitted from said transfer means to connect said link means to a selected one of said associated stations; said link means comprising a source of talking battery connected over circuit connections to said line equipment and relay control means operated in response to operation of said selector and said transfer equipment to transmit signals to said audible signal receiving device at one of said first plurality of stations and to said visual signal receiving device at all of said first plurality of stations.

16. An intercommunicating telephone system including: a first plurality of stations each including a calling device, an audible signal receiving device, a visual signal receiving device, and at least one circuit controlling means; a second plurality of stations including a common talking path and each of said second plurality of stations including a calling device and a signal receiving device; at least one station located remote to said first and said second plurality of stations including an audible signal receiving device and a calling device; a trunk circuit connected to a central office and to at least one of said first plurality of stations; extension means connected to said trunk including a repeating coil and relay control means operated in response to actuation of said circuit control means at said one of said first plurality of stations connected to said central office trunk to connect said central office trunk to a second one of said first plurality of stations; at least one of said first plurality of stations including circuit control means connected to said extension means and signalling means connected to at least one other of said first plurality of stations; a plurality of associated line equipments each connected to a different one of said first plurality of stations operated on seizure to provide a talking path between two of said first plurality of stations; link means including circuit connections to each of said line equipments; selecting means including a rotary switch operated in response to operation of one of said calling devices to transmit a signal potential to one of said signal receiving devices, connected to said first plurality of stations over said link means and to said second plurality of stations over said common talking path; transfer means connected to said selecting means including an individual circuit connection to each of said first plurality of stations and each of said second plurality of stations and said remote station operated in response to operation of said selecting means to transmit a signal to a selected one of said stations over one of said circuit connections; said line equipments each including means operated in response to actuation of one of said circuit control means at an associated station to connect said line equipment to said link means and in response to a signal transmitted from said transfer means to connect said link means to a selected one of said associated stations; said link means comprising a source of talking battery connected over circuit connections to said line equipment, relay control means operated in response to operation of said selector and said transfer equipment to transmit signals to said audible signal receiving device at one of said first plurality of stations and to said visual signal receiving device at all of said first plurality of stations; long line equipment connecting said remotely located station to said common talking path including signal repetition means whereby pulses from said calling device at said remotely located station are repeated and transmitted to said selector equipment and signal transmitting means whereby signals received from said transfer equipment are transmitted to said audible signal receiving device at said remotely located station, said long line equipment on seizure conditioning said selecting means to prevent operation by any of said first and said second plurality of stations.

No references cited.